(12) United States Patent
Chen (10) Patent No.: US 8,744,168 B2
(45) Date of Patent: Jun. 3, 2014

(54) TARGET ANALYSIS APPARATUS, METHOD AND COMPUTER-READABLE MEDIUM

(75) Inventor: Maolin Chen, Beijing (CN)

(73) Assignee: Samsung Electronics Co., Ltd., Suwon-Si (KR)

( * ) Notice: Subject to any disclaimer, the term of this patent is extended or adjusted under 35 U.S.C. 154(b) by 326 days.

(21) Appl. No.: 12/862,330

(22) Filed: Aug. 24, 2010

(65) Prior Publication Data

US 2011/0044506 A1    Feb. 24, 2011

(30) Foreign Application Priority Data

Aug. 24, 2009   (CN) .......................... 2009 1 0168294
Apr. 20, 2010   (KR) ........................ 10-2010-0036592

(51) Int. Cl.
  *G06K 9/00*   (2006.01)
  *G06T 7/00*   (2006.01)

(52) U.S. Cl.
  CPC ............ *G06K 9/0067* (2013.01); *G06T 7/0012* (2013.01)
  USPC ......................................... 382/154; 382/224

(58) Field of Classification Search
  USPC ................................................. 382/154, 224
  See application file for complete search history.

(56) References Cited

U.S. PATENT DOCUMENTS

| 2003/0169906 A1* | 9/2003 | Gokturk et al. ............... 382/115 |
| 2004/0151342 A1* | 8/2004 | Venetianer et al. ........... 382/103 |
| 2005/0084156 A1* | 4/2005 | Das et al. ...................... 382/224 |
| 2008/0317331 A1* | 12/2008 | Winn et al. .................... 382/154 |

\* cited by examiner

*Primary Examiner* — Hadi Akhavannik
(74) *Attorney, Agent, or Firm* — Staas & Halsey LLP

(57) ABSTRACT

Provided is a target analysis apparatus, method and computer-readable medium based on a depth image and an intensity image of a target is provided. The target analysis apparatus may include a body detection unit to detect a body of the target from the intensity image of the target, a foreground segmentation unit to calculate an intensity threshold value in accordance with intensity values from the detected body, to transform the intensity image into a binary image using the intensity threshold value, and to mask the depth image of the target using the binary image as a mask to thereby obtain a masked depth image, and an active portion detection unit to detect an active portion of the body of the target from the masked depth image.

17 Claims, 9 Drawing Sheets

(I)

(II)

(III)

(III)

TARGET ANALYSIS APPARATUS, METHOD AND COMPUTER-READABLE MEDIUM

CROSS-REFERENCE TO RELATED APPLICATIONS

This application claims the benefit of Chinese Patent Application No. 200910168294.8, filed on Aug. 24, 2009, in the Chinese Intellectual Property Office, and the benefit of Korean Patent Application No. 10-2010-0036592, filed on Apr. 20, 2010, in the Korean Intellectual Property Office, the disclosure of which is incorporated herein by reference.

BACKGROUND

1. Field

One or more embodiments relate to a target analysis method, apparatus and computer-readable medium, and more particularly, to a target analysis method, apparatus and computer-readable medium based on a depth image and an intensity image, which may accurately detect each portion of a desired video target from a video stream, thereby obtaining motion information of the target.

2. Description of the Related Art

Along with various applications such as three-dimensional (3D) animation, games, human interface, and the like, there are wide research activities on video target analysis technology in current computer video and model identification regions. To perform an animation simulation, each portion of the video target may need to be detected in advance and motion information of the target may need to be obtained.

To detect each portion of the video target, a bottom-up method and a top-down method may be used. In the bottom-up method, each portion of the target may be detected using characteristics of each portion of the target. For example, a skin color or a line type of arms and legs may be detected, and then a registration may be performed of detected candidate portions based on the detected information. The bottom-up method may significantly rely on typical characteristics of each portion of the target, and may be influenced by background noise. In the top-down method, a repeated retrieval may be performed on a space of the target shape, a hypothesis may be suggested, and a hypothesis evaluation may be performed. In the top-down method, a searching space may need to be significantly reduced to accelerate a calculation speed.

In general, a foreground may need to be segmented from a source image in a video target analysis process. Specifically, in the foreground segmentation, the target may be accurately detected by deleting a complex background region. A conventional foreground segmentation method may be performed based on a color image of a charge-coupled device (CCD) camera. Since a background of the color image is significantly complex, a segmentation calculation amount based on a foreground of the color image may be significantly great and inaccurate. The foreground segmentation method is performed based on a current depth image, however, and may be inaccurately performed.

Once the foreground segmentation is inaccurately performed, a consecutive target analysis subsequently performed may be significantly difficult to perform, and the target analysis result may be influenced by interference of background noise having similar characteristics. Also, rich edge characteristics may frequently occur in the complex background region, and the edge characteristics may become noise to influence an analysis result of the edge characteristic in the processes of detecting each portion of the target and of evaluating the hypothesis.

Accordingly, there is a demand for a target analysis method, apparatus and computer-readable medium which may accurately segment a foreground to improve a target analysis performance.

SUMMARY

One or more embodiments provide a target analysis method, apparatus and computer-readable medium which may accurately segment a foreground to improve a target analysis performance.

One or more embodiments also provide a target analysis method and apparatus which may realize an accurate ridge verification.

One or more embodiments also provide a target analysis method and apparatus which may use an intensity image and a depth image of a Time of Flight (TOF) without being limited to use of a color image.

The foregoing and/or other aspects are achieved by providing a target analysis apparatus having a depth image and an intensity image of a target as an input, the target analysis apparatus including: a body detection unit to detect a body of the target from the intensity image of the target, a foreground segmentation unit to calculate an intensity threshold value in accordance with intensity values from the detected body, to transform the intensity image into a binary image using the intensity threshold value, and to mask the depth image of the target using the binary image as a mask to thereby obtain a masked depth image, and an active portion detection unit to detect an active portion of the body of the target from the masked depth image.

The body detection unit may be trained using a statistical learning method to detect, from the intensity image, components constituting the body of the target, and to select, from a plurality of candidates for the components of the body, a candidate to meet a geometry constraint as the component of the body.

The foreground segmentation unit may have as the intensity threshold value, a value obtained by averaging the intensity values from the detected body.

The active portion detection unit may include a ridge detection unit to detect a plurality of ridges from the masked depth image, and a ridge verification unit to verify the plurality of ridges and to select an optical ridge.

The ridge detection unit may divide a depth image of the mask into the active portion of the body and a non-active portion of the body, and calculate a plurality of ridge candidates of each of the ridges from a candidate of the active portion.

The ridge detection unit may classify the depth image of the mask into the active portion and the non-active portion using an average depth value of the non-active portion as a threshold value.

The ridge verification unit may determine a connection point between the active portion and the non-active portion in accordance with the body detected by the body detection unit, connect the determined connection point and an end of one of the plurality of ridges to generate an imaginary ridge, and verify the plurality of ridges and the imaginary ridge.

The non-active portion of the body of the target includes a human head and torso, and the active portion includes human arms and legs.

The foregoing and/or other aspects are achieved by providing a target analysis method based on a depth image and an intensity image of a target, the target analysis method including: detecting a body of the target from the intensity image of the target, calculating an intensity threshold value in accordance with intensity values from the detected body, transforming the intensity image into a binary image using the intensity threshold value, masking the depth image of the target using the binary image as a mask to thereby obtain a masked depth image, and detecting an active portion of the body of the target from the masked depth image.

According to another aspect of one or more embodiments, there is provided at least one computer readable medium including computer readable instructions that control at least one processor to implement methods of one or more embodiments.

Additional aspects of embodiments will be set forth in portion in the description which follows and, in portion, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. Embodiments are described below to explain the present disclosure by referring to the figures.

Hereinafter, according to example embodiments, a target analysis apparatus, method and computer-readable medium will be described in conjunction with reference to drawings. According to example embodiments, the target analysis apparatus, method and computer-readable medium may perform an analysis on a desired target of a video stream, and obtain information about each portion of the target.

In general, a video target to be analyzed may be classified into two portions. One is a relatively fixed non-active portion such as a shape, a ratio, and the like, for example, a human head, a human torso, a base of specific equipment, and the like. The other is an active portion where a shape is not relatively fixed, for example, human arms/legs, an active arm of specific equipment, and the like.

According to example embodiments, body detection may be performed using a classification learning device or a detector having been trained using a statistical learning method with respect to a simple main body, and a foreground segmentation may be performed on a relatively complex active portion of the target to eliminate background noise.

For convenience of description, according to example embodiments in the target analysis method, apparatus and computer-readable medium, a human body will be described as a target. However, embodiments are not limited thereto.

Figure 1:
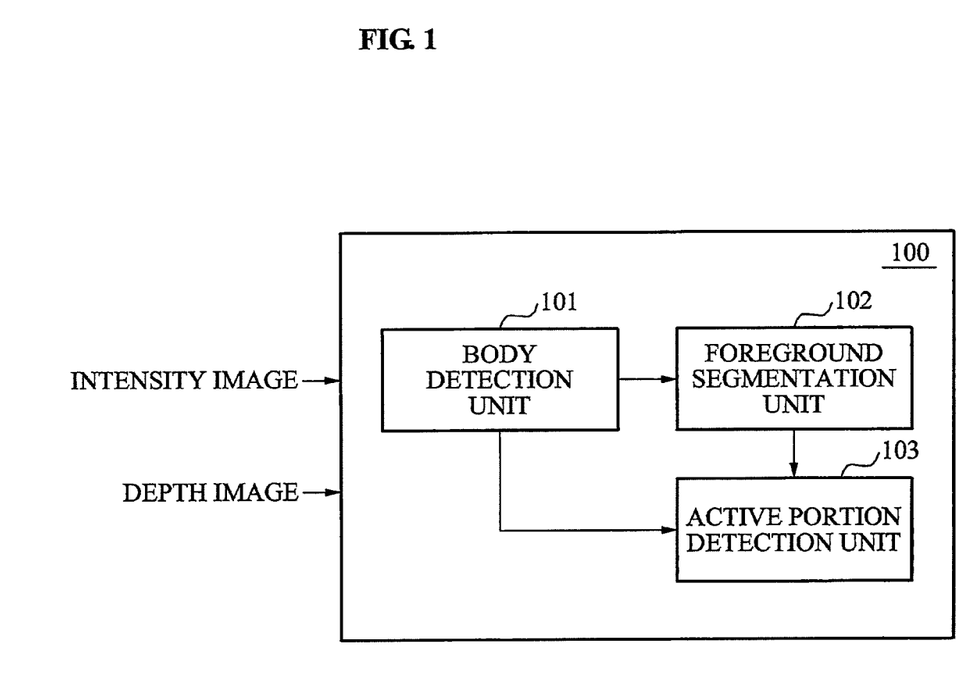
FIG. 1 is a block diagram illustrating a structure of a target analysis apparatus according to example embodiments.

FIG. 1 is a block diagram illustrating a structure of a target analysis apparatus 100 according to example embodiments.

The target analysis apparatus 100 according to example embodiments includes a body detection unit 101, a foreground segmentation unit 102, an active portion detection unit 103.

The target analysis apparatus 100 may receive, from the outside, an intensity image and a depth image of a target as an input of the target. Alternatively, the target analysis apparatus 100 may further include a device capturing the intensity image and the depth image of the target, for example, a Time of Flight (TOF) camera.

An input system may include a color Charge-Coupled Device CCD camera of a high resolution, and the TOF camera of a low resolution, as the TOF camera. An output of the color CCD camera may be a color video stream, and an output of the TOF camera may be an intensity video stream and a depth video stream. The color camera and the TOF camera may share the same optical axis, and an actual color (color image) camera and the TOF camera (intensity and depth images) register images in a pixel unit. The camera has been calculated and set in advance in its manufacturing process. An output of the camera may be a video stream of six elements, and may relate to color elements (Red, Green, and Blue) and coordinates (x, y, z) of a three-dimensional (3D) space. In a non-incorporated camera set, the color camera and the TOF camera may be combined in different positions or baselines to be used. A video image from the two cameras, the color camera and the TOF camera (color and intensity) may be calculated in a standard calculation method in advance. Next, an arrangement between a color camera image and a TOF camera image may be made by performing a transformation and optimization for image matching of feature points from the two images. In this manner, the six element-video may be obtained as an input.

The intensity image may include a reflection capability of an outer surface material of a target, and each pixel value of the intensity image may express a reflection strength value of the outer surface material of the target. The depth image may include a difference between a camera and an outer surface of the target, and each pixel value of the depth image may express a depth value from the camera to the outer surface of the target.

Figure 2:
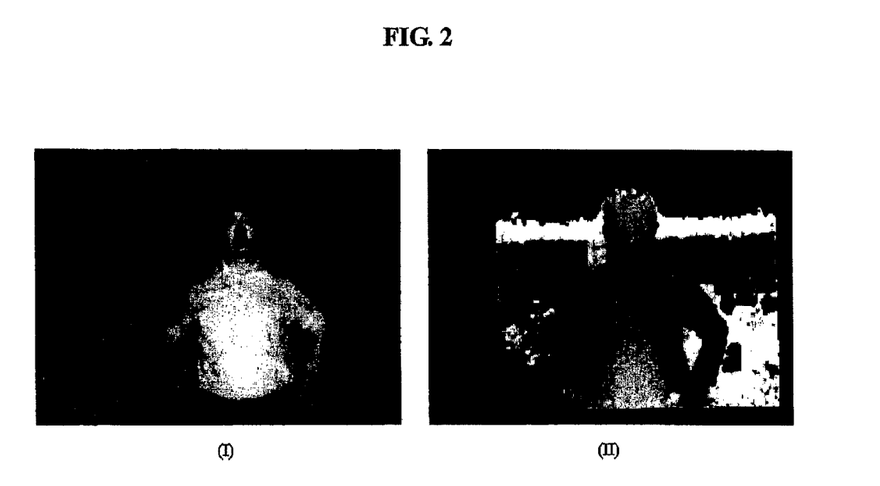
FIG. 2 illustrates examples of an intensity image and a depth image.
Figure 3:
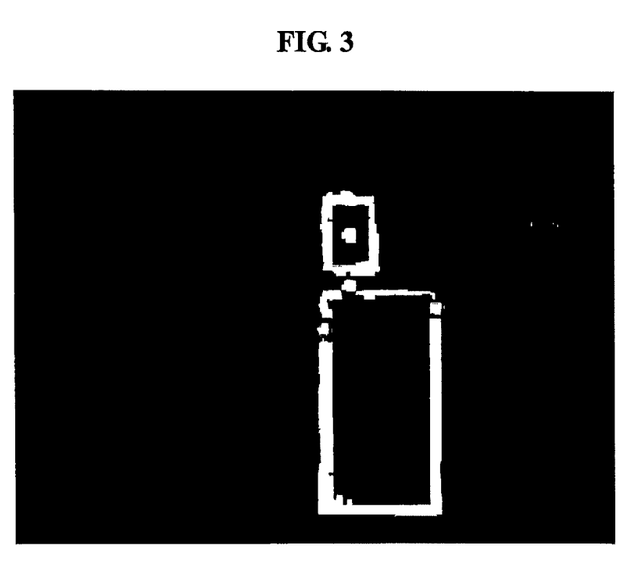
FIG. 3 is an image illustrating a main body of a target.

FIG. 2 illustrates examples of an intensity image and a depth image, and FIG. 3 is an image illustrating a main body of a target.

As illustrated in FIG. 3, the body detection unit 101 may detect a body of a target from an intensity image of the target, and particularly, in a case of a human body as the target, detect a non-active portion including a human head and a human torso. As a conventional target body detection method using a color image, a detection method based on a background difference, a color classification method, and the like may be used. However, according to example embodiments, a main body of the target may be detected based on the intensity image. The intensity image may be obtained by the TOF camera.

The body detection unit 101 may use a portion classification device or a portion detector where a training is performed using a statistical learning method of a sample. For example, the main body detection unit 101 may use a well-known statistical learning method. In the statistical learning method, since an input is the intensity image, a detection speed may be relatively fast, and a cost corresponding to about 30 minutes may be reduced, in comparison with relatively complex color image of a background. However, embodiments are not limited thereto, and the body detection unit 101 may detect the body of the target from the intensity image using other target detection methods.

The body detection unit 101 may determine a position, a size, a ratio, and the like of the body of the target by scanning the inputted intensity image. In general, the non-active portion of the body of the target may be obtained considering a relatively fixed geometric restraint relation of the body. For example, the human head and the human torso in a state of standing may be obtained considering a vertical position-restraint relation.

Thus, the body of the target may be detected in two methods as follows. In one method, a single body may be detected by scanning all windows of inputted intensity images, and other body components of the target may be detected by scanning image regions adjacent to the body based on geometric relation among components of the body, thereby significantly reducing a number of scanned windows. In the other method, all possible body components may be detected by scanning all windows of the inputted intensity images, and this method may not consider a well-known geometric restraint relation among the body components of the target. Specifically, candidates of all body components may be detected, and when a plurality of candidates of each body component exists, the most preferable combination of the body components may be selected.

The non-active portion of the body of the target detected by the body detection unit 101 may be used to verify an active portion region when calculating a threshold value and detecting an active portion in a repeated foreground segmentation process.

The foreground segmentation unit 102 may eliminate a background region (noise region) of a depth image, and segment a foreground of the target. As described above, both the foreground segmentation method based on the conventional color image and the foreground segmentation method based on the depth image may be inaccurately performed, and performance of a target analysis may be difficult. Thus, according to example embodiments, the foreground segmentation may be easily and accurately performed using the intensity image and the depth image. Hereinafter, operations of the foreground segmentation 102 will be further described.

The foreground segmentation unit 102 may calculate a single intensity threshold value from the intensity image based on the body of the target detected by the body detection unit 101. Specifically, a statistical analysis may be performed on intensity values of all pixels of the body to obtain the intensity threshold value.

Next, the foreground segmentation unit 102 may perform a binary operation on each pixel value of the intensity image by comparing each pixel value of the inputted intensity image and the calculated intensity threshold value, thereby transforming the intensity image to a binary image. For example, a pixel of the intensity image where an intensity value is greater than the intensity threshold value may be expressed as a target, and a pixel of the intensity image where an intensity value is less than the intensity threshold value may be expressed as a background. Here, by performing a value-filtering, an erosion, and a dilate operation on the generated binary image, noise may be eliminated from the binary image.

Figure 4:
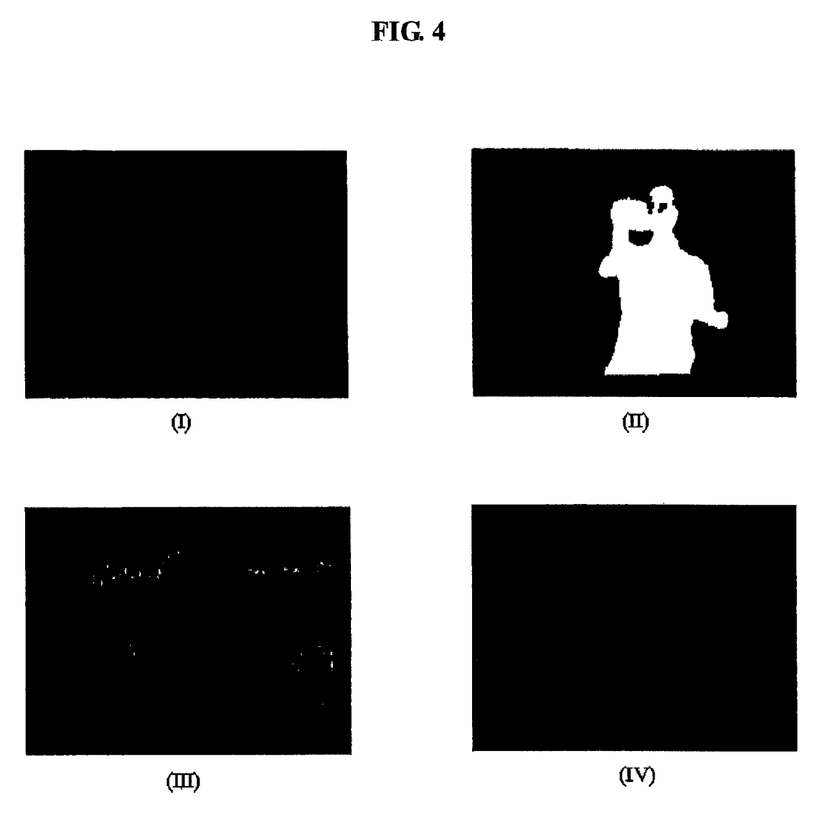
FIG. 4 illustrates an example of an intensity image, a binary image, a depth image, and a masking depth image according to example embodiments.

FIG. 4 illustrates an example of an intensity image, a binary image, a depth image, and a masking depth image according to example embodiments.

An image (I) of FIG. 4 illustrates an example of an original intensity image, and an image (II) of FIG. 4 illustrates an example of a binary image generated by an intensity threshold value.

A masking operation may be performed on an inputted depth image using the binary image to obtain a masking depth image. The binary image may classify the depth image into two regions, for instance a foreground region where a target exists and a background region. Accordingly, the masking may be performed on the depth image using the binary image to eliminate the background region. For example, an AND operation may be performed between the binary image and the depth image to obtain the masking depth image.

An image (III) of FIG. 4 illustrates an example of the inputted depth image, and an image (IV) of FIG. 4 illustrates an example of obtaining the masking depth image using the binary image.

The masking depth image may be obtained by the foreground segmentation unit 102, and then active portion detection unit 103 may detect an active portion of a target, for example, humans arms/legs, based on the masking depth image. As illustrated in the image (IV) of FIG. 4, complex edges may be significantly reduced due to elimination of the background region of the masking depth image, so that the active portion detection unit 103 may accurately detect the active portion of the target.

Currently, a lower layer characteristic-based method and a higher layer characteristic-based method may be used as a detection method of human arms/legs. In other words, these methods may be used to detect the active portion.

The lower layer characteristic-based method may detect the active portion of the target using characteristics of a transformation point, an edge line, and the like.

The higher layer characteristic-based method may use positive/negative sample learning classification devices or a detector, as a model identification method. The active portion detection unit 103 may detect the active portion of the target from the masking depth image using the above lower/higher characteristic-based method.

Hereinafter, using a detection method utilizing edge characteristics based on Hough transformation, the active portion detection unit 103 will be further described. However, embodiments are not limited thereto.

Figure 5:
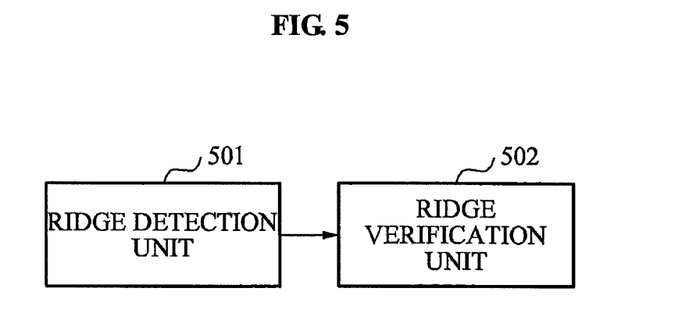
FIG. 5 is a diagram illustrating a structure of an active portion detection unit according to example embodiments.

The active portion detection unit 103 includes a ridge detection unit 501 and a ridge verification unit 502. The ridge detection unit 501 may detect candidates for a ridge of the active portion of the target. The ridge verification unit 502 may verify the detected candidates for the ridge to select the most preferable ridge. Here, the ridge may denote a central line.

Figure 6:
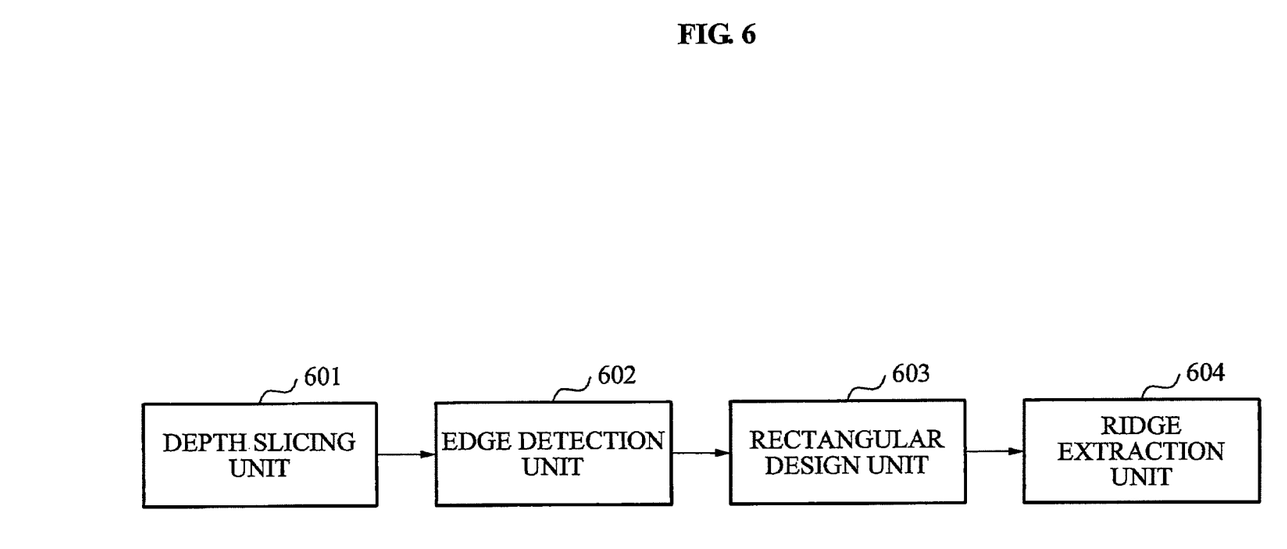
FIG. 6 is a diagram illustrating a structure of a ridge detection unit according to example embodiments.
Figure 7:
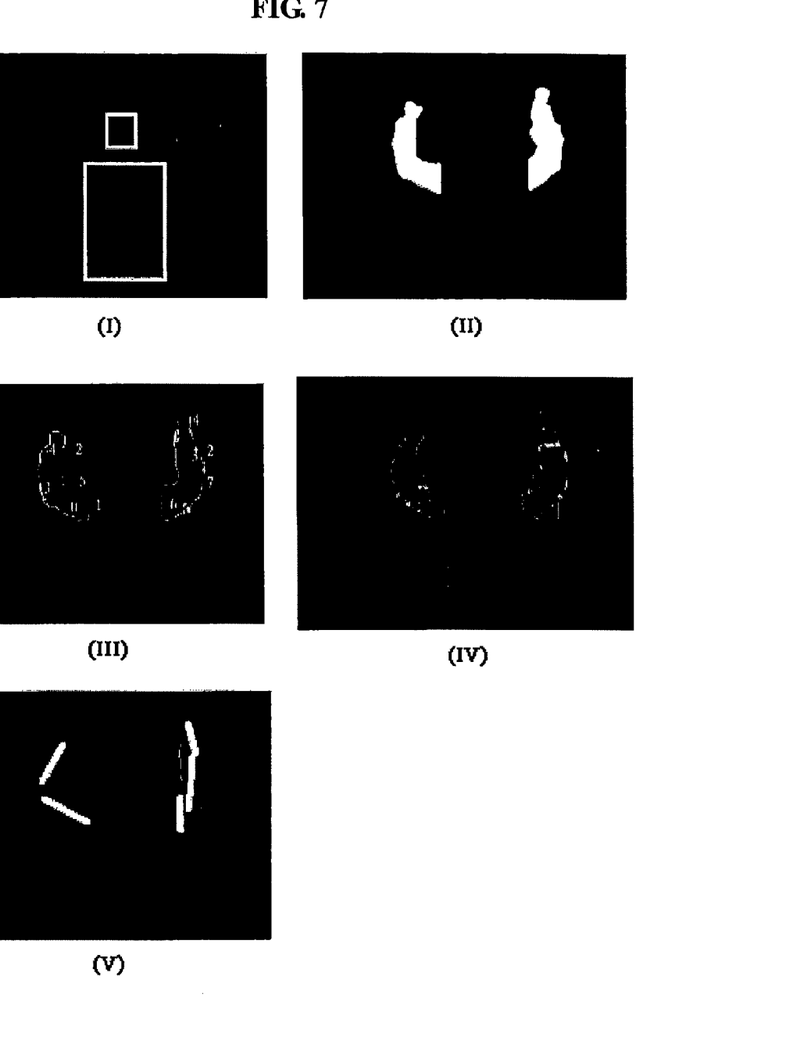
FIG. 7 illustrates a detection process of the ridge detection unit of FIG. 6.

FIG. 5 is a diagram illustrating a structure of an active portion detection unit according to example embodiments, FIG. 6 is a diagram illustrating a structure of a ridge detection unit according to example embodiments, and FIG. 7 illustrates a detection process of the ridge detection unit of FIG. 6.

As illustrated in FIGS. 5 and 6, the ridge detection unit 501 includes a depth slicing unit 601, an edge detection unit 602, a rectangular design unit 603, and a ridge extraction unit 604.

The depth slicing unit 601 may determine, from a masking depth image, a region where an active portion of a target exists. Here, the body detection unit 101 may determine, as an active portion extended from a non-active portion of the target, remaining regions excluding the non-active portion of the masking depth image, as illustrated in (I) of FIG. 7.

Also, as with a human left arm shown in FIG. 3, a portion where the active portion and the non-active portion of the target are overlapped in the intensity image may exist. In this case, the depth slicing unit 601 may calculate an average depth value of the non-active portion, and use the calculated average depth value as a threshold value of depth slicing that determines whether a pixel of the non-active portion is practically included in the non-active portion or the active portion. This is because the non-active portion and the active portion are positioned in different depth planes when the non-active portion and the active portion are overlapped in the depth image. When an absolute value of a difference between a predetermined pixel and the threshold value of the depth slicing is greater than a predetermined constant, the predetermined pixel may be included in the active portion of the target, and otherwise, may be included in the non-active portion.

An image (II) of FIG. 7 illustrates human arms/legs determined by the depth slicing unit 601.

The edge detection unit 602 may perform the Hough transformation on the depth image to obtain a Hough line indicating image edge characteristics. The Hough line may show edges of the active portion of the target from the active portion determined by the depth slicing unit 601.

An image (III) of FIG. 7 illustrates an example of the obtained Hough line.

As illustrated in an image (IV) of FIG. 7, the rectangular design unit 603 may generate a rectangle using the Hough line to cover the active portion of the target. A process of designing the rectangle may be performed as follows. First, the Hough line may be arranged based on a length of the obtained Hough line. Next, a relatively long Hough line may be used as a long side of a rectangle, and a line obtained by scanning a depth value-transformation point from the depth image along a direction perpendicular to the long side of the rectangle may be used as a short side of the rectangle, thereby determining the rectangle. When rectangles having different sizes are overlapped, extra rectangles may be removed in a manner of removing a relatively small-sized rectangle of the overlapped rectangles.

As illustrated in an image (V) of FIG. 7, the ridge extraction unit 604 may extract a central line by connecting two centers of the short sides from the rectangle generated by the rectangular design unit 603, and the extracted central line may be determined as a possible ridge.

The ridge detection unit 501 may detect, from the masking depth image, all possible ridges for the active portion, i.e., ridge candidates for the active portion. The ridge verification unit 502 may perform a ridge verification based on the detected ridge candidates to thereby determine a final frame structure of the active portion.

The ridge verification unit 502 may verify the ridge candidates detected by the ridge detection unit 501 using an existing verification model having been verified, in order to select the most preferable ridge, and a ridge of an active portion of an original target may be finally selected. The ridge verification unit 502 may need to verify which ridge candidates are combined and then the combined ridge candidates are matched with an actual active portion. For this purpose, the ridge verification unit 502 may use a hypothesis generation-evaluation method. Specifically, in the hypothesis generation-evaluation method, several ridges may be selected from among all ridge candidates to connect the selected ridges to each other in a predetermined scheme, and then a probability of the hypothesis may be calculated using restraint relation of the existing verification model of the target and the related calculation scheme. Next, a hypothesis having the greatest probability may be selected to thereby detect a final ridge structure of the target.

The ridge verification unit 502 may perform the ridge verification using a currently commercialized verification model, for example, a Felzenszwalb pictorial structure scheme (P. F. Felzenszwalb, D. P. Huttenlocher, "Efficient Matching of Pictorial Structures", CVPR 2000). Hereinafter, using the pictorial structure scheme, operations of the ridge verification unit 502 will be further described. However, embodiments are not limited thereto.

Figure 8:
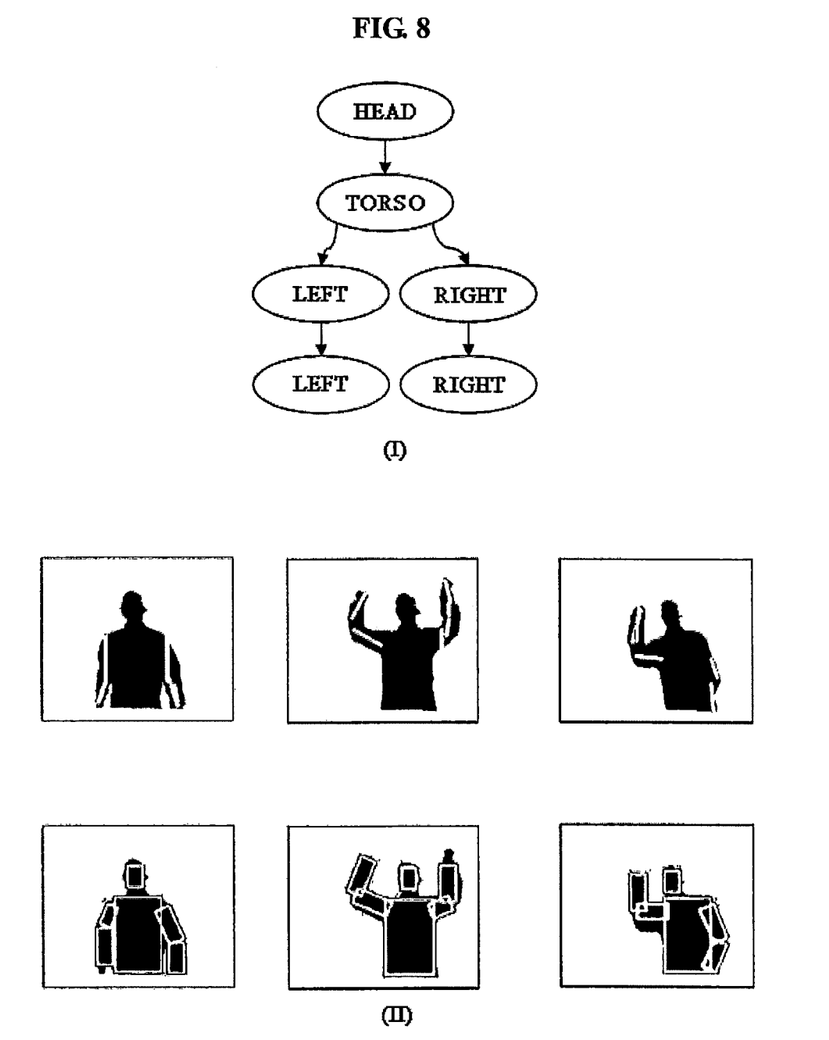
FIG. 8 illustrates an example of a searching tree of each target and a ridge verification result according to example embodiments.

FIG. 8 illustrates an example of a searching tree of each target and a ridge verification result according to example embodiments.

As illustrated in a diagram (I) of FIG. 8, the ridge verification unit 502 may determine a tree structure of a target. The tree structure may represent a searching space of the target, and show a position and connection relation of each portion of the target. A variable of each node of the tree structure may include a position of a 3D space, a portion ratio, a rotation angle, and the like.

Here, the body detection unit 101 may apply, to a searching tree structure, a connection position, a ratio, an angle, and the like of each of detected non-active portions of the target, and the applied information may be determined as a constant. However, the ridge verification unit 502 may apply ridge candidates to each node of the tree structure to thereby generate a hypothesis. The ridge verification unit 502 may calculate an observation similarity between the hypothesis and an actual image using the following Equation 1.

$$\text{match} = w \times \frac{NoMatchedPt}{(MatchedPt + NoMatchedPt) \times nS + 1/MatchedPt} \quad \text{[Equation 1]}$$

In Equation 1, "MatchedPt" denotes a size ratio of a pixel, different from zero, where a portion determined by the hypothesis covers in a depth image and the portion determined by the hypothesis, "NoMatchedPt" denotes a size ratio of a pixel of zero where the portion determined by the hypothesis covers in the depth image and the portion determined by the hypothesis, "nS" denotes a rectangular proportion factor, and "w" denotes a weight coefficient.

A model registration between the hypothesis and a geometric model may be calculated by the following Equation 2.

$$d_{ij}(l_i, l_j) = \sum_{k=1}^{3} w_b^k |(alpha_j^k - alpha_i^k) - alpha_{ij}^k| + \sum_{k=1}^{3} w_s^k |(\log nS_j^k) - \log nS_i^k) - \log nS_{ij}^k| + \sum_{k=1}^{3} w^k |p_{ij} - p_{ji}| \quad \text{[Equation 2]}$$

In Equation 2, "alpha" denotes an angle between adjacent portions, that is, an angle between a parent node and a child node of the tree structure. "alpha$_i$" denotes an ideal angle between a node i and a node j, and "log(nS$_i^k$)" denotes a ratio factor of the node j of a k-order. "log(nS$_{ij}^k$)" denotes an ideal ratio factor of a model, and "p$_{ij}$" denotes a coordinate difference of a connection line between the node i and the node j.

However, an approximate calculation may be performed on a subsequent ridge verification probability of the hypothesis by the following Equation 3.

$$D(l_i) = \min_j(d_{ij}(l_i, l_j) + \text{match}) \qquad \text{[Equation 3]}$$

The ridge verification unit 502 may detect a final ridge structure of the target by finding an excellent path having a maximum ridge verification probability.

An image (II) of FIG. 8 illustrates an example of a ridge verification result.

As described above, according to example embodiments, the ridge verification unit 502 may apply, to the searching tree, a connection position, a ratio, an angle, and the like of body components of the target detected by the body detection unit 101, and a searching space may be significantly reduced to improve a calculation speed.

When a large number of the ridge candidates exist and various connection methods corresponding to the ridge candidates exist, the searching space may significantly increase, and a corresponding calculation amount may increase. In the body detection unit 101, the non-active portion of the body of the target, for example, the human head and torso is detected, and the position and ratio of the non-active portion may be determined.

In a specific target type, a ratio of each portion may satisfy a predetermined condition, and a relatively small change in ratio may be generated. For example, using a statistical scheme, a ratio of human arms may be inferred from a human head or a human torso. Accordingly, using the detected non-active portion as a constant of the searching space, a process of calculating all possible combinations of body components may not need to be performed, so that the searching space may be significantly reduced and a calculation amount may be reduced.

Also, as with a right arm of FIG. 3, a predetermined portion of the target may be occluded, or omitted. In this case, the occluded or omitted portion may be restored using a concept of the hypothesis described with reference to the ridge verification unit 502, to thereby improve ridge verification speed and accuracy.

First, a connection point between an active portion and a non-active portion of the body of the target detected by the body detection unit 101. For example, a position of a shoulder point may be determined. In general, the connection point may be a hopping point of a curve of wave on a vertical projective diagram and a horizontal projective diagram, as illustrated in FIG. 3.

After determining the connection point, a single imaginary ridge may be generated from the connection point, and a single hypothesis may be generated to perform a hypothesis verification. For example, the connection point may be connected to an end point of a k-th ridge candidate to generate a single imaginary ridge candidate. The imaginary ridge candidate and the k-th ridge candidate may configure a single shoulder of the target, thereby generating the hypothesis.

Here, from Equation 2, the following Equation 4 may be obtained.

$$d_{ij}(l_i, l_j) = \sum_{k=1}^{3} w_\theta^k |(alpha_j^k - alpha_i^k) - alpha_{ij}^k| + \sum_{k=1}^{3} w^k |p_{ij} - p_{ji}| \qquad \text{[Equation 4]}$$

Figure 9:
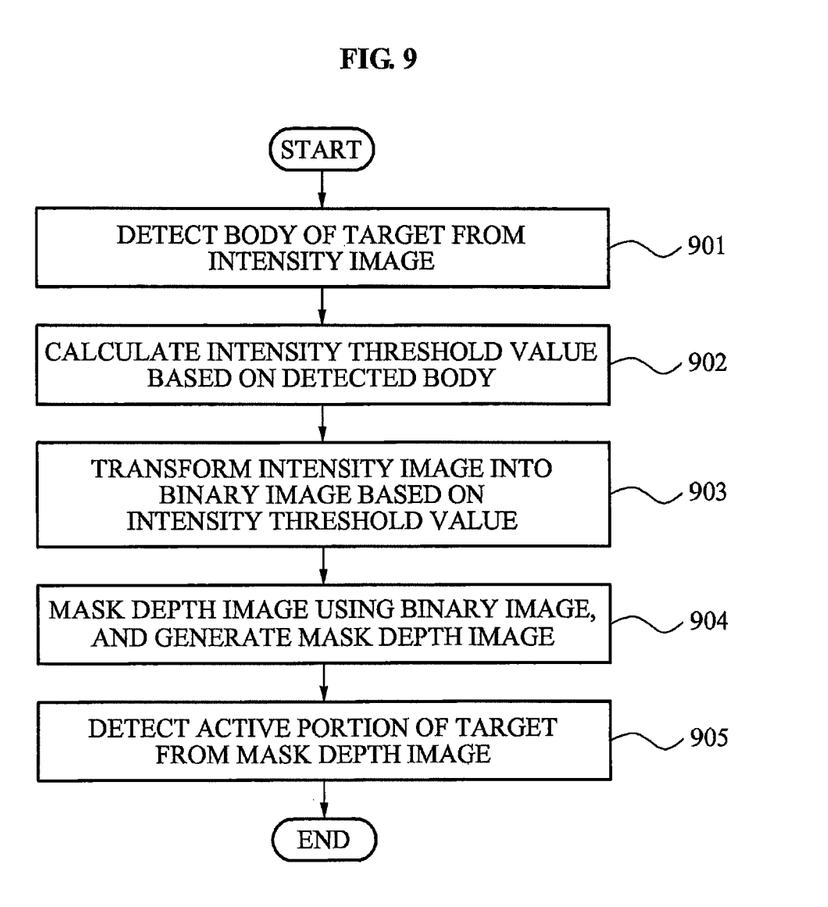
FIG. 9 is a flowchart illustrating a target analysis method according to example embodiments.

FIG. 9 is a flowchart illustrating a target analysis method according to example embodiments.

Hereinafter, the target analysis method will be described with reference to FIG. 9.

In operation 901, the target analysis method may detect a body of a target from an intensity image of the target. In this instance, to detect the body of the target, non-active portions, for example, a human head or a human torso, may be mainly detected. The intensity image of the target may be obtained using a TOF camera. Also, as described above, using the portion detector trained using the statistical learning method, the body of the target may be detected from the target by scanning components of the non-active portion and applying a restraint condition.

In operation 902, the target analysis method may calculate an intensity threshold value from the intensity image based on the detected body of the target. Specifically, the intensity threshold value may be obtained by performing a statistical averaging operation on intensity values of all pixels determined as the body in operation 901 through the intensity image.

In operation 903, the target analysis method may transform the intensity image to a binary image using the calculated intensity threshold value.

In operation 904, the target analysis method may perform a masking operation on a depth image of the target using the binary image to thereby obtain a masking depth image.

In operation 905, the target analysis method may detect from the masking depth image, an active portion of the target, i.e., human arms/legs. According to the above described method, the active portion of the target may be detected from the masking depth image.

As described above, according to example embodiments, there are provided a target analysis apparatus, method and computer-readable medium, which detect each portion of a target by analyzing the target based on the intensity image and the depth image of the target, and extract the ridge, thereby obtaining motion information of the target.

Also, according to example embodiments, to replace a color image having a complex background, the foreground segmentation may be performed using intensity and depth video streams to be analyzed thereby realizing more accurate foreground segmentation.

Also, according to example embodiments, a target edge extraction may be accurately performed based on an excellent result of the foreground segmentation, thereby detecting each component of the target.

Also, the body of the target may be satisfactorily detected from the intensity image by applying a statistical model detector of a sample to the intensity image.

Also, the non-active portion of the detected body may be applied to a consecutive ridge verification system subsequently performed, thereby reducing the searching space of the verification system and significantly reducing an operation amount.

Also, occluded or omitted portions may be restored using an imaginary portion in the ridge verification system, thereby improving a ridge verification speed and accuracy.

The target analysis method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it should be appreciated by those skilled in the art that changes may be made in these embodiments without departing from the principles and spirit of the disclosure, the scope of which is defined by the claims and their equivalents.

What is claimed is:

1. A target analysis apparatus having a depth image and an intensity image of a target as an input, the target analysis apparatus comprising:
    a body detection unit to detect a body of the target from the intensity image of the target;
    a foreground segmentation unit to calculate an intensity threshold value in accordance with intensity values from the detected body, to transform the intensity image into a binary image using the intensity threshold value, and to mask the depth image of the target using the binary image as a mask to thereby obtain a masked depth image; and
    an active portion detection unit to detect an active portion of the body of the target from the masked depth image,
    wherein the active portion of the body includes at least one part of the body having a relatively large motion,
    wherein a non-active portion of the body of the target includes a human head and torso, and the active portion includes human arms and legs.

2. The target analysis apparatus of claim 1, further comprising:
    a Time-Of-Flight (TOF) camera set to capture the depth image and the intensity image of the target to output the captured images.

3. The target analysis apparatus of claim 1, wherein the body detection unit is trained using a statistical learning method to detect from the intensity image, components constituting the body of the target, and to select, from a plurality of candidates for the components of the body, a candidate to meet a geometry constraint as the component of the body.

4. The target analysis apparatus of claim 1, wherein the foreground segmentation unit has as the intensity threshold value, a value obtained by averaging the intensity values from the detected body.

5. The target analysis apparatus of claim 1, wherein the active portion detection unit comprises:
    a ridge detection unit to detect a plurality of ridges from the masked depth image; and
    a ridge verification unit to verify the plurality of ridges and to select an optical ridge.

6. The target analysis apparatus of claim 5, wherein the ridge detection unit divides a depth image of the mask into the active portion of the body and the non-active portion of the body, and calculates a plurality of ridge candidates of each of the ridges, from a candidate of the active portion.

7. The target analysis apparatus of claim 6, wherein the ridge detection unit classifies the depth image of the mask into the active portion and the non-active portion, using an average depth value of the non-active portion as a threshold value.

8. The target analysis apparatus of claim 5, wherein the ridge verification unit determines a connection point between the active portion and the non-active portion in accordance with the body detected by the body detection unit, connects the determined connection point and an end of one of the plurality of ridges to generate an imaginary ridge, and verifies the plurality of ridges and the imaginary ridge.

9. A target analysis method based on a depth image and an intensity image of a target, the target analysis method comprising:
    detecting, by a computer, a body of the target from the intensity image of the target;
    calculating, by the computer, an intensity threshold value in accordance with intensity values from the detected body;
    transforming, by the computer, the intensity image into a binary image using the intensity threshold value;
    masking, by the computer, the depth image of the target using the binary image as a mask to thereby obtain a masked depth image; and
    detecting, by the computer, an active portion of the body of the target from the masked depth image,
    wherein the active portion of the body includes at least one part of the body having a relatively large motion,
    wherein a non-active portion of the body of the target includes a human head and torso and the active portion includes human arms and legs.

10. The target analysis method of claim 9, further comprising:
    capturing the depth image and the intensity image of the target using a TOF camera set.

11. The target analysis method of claim 9, wherein the detecting of the body comprises:
    detecting, from a plurality of candidates for the components of the body, a candidate to meet a geometry constraint as the component of the body, using a portion detector trained through a statistical learning method.

12. The target analysis method of claim 9, wherein the calculating has as the intensity threshold value, a value obtained by averaging the intensity values from the detected body.

13. The target analysis method of claim 9, wherein the detecting of the active portion comprises:
    detecting a plurality of ridges from the masked depth image; and
    verifying the plurality of ridges and selecting an optical ridge.

14. The target analysis method of claim 13, wherein the detecting of the plurality of ridges classifies a depth image of the mask into the active portion of the body and the non-active portion of the body, and calculates a plurality of ridge candidates of each of the ridges from a candidate of the active portion.

15. The target analysis method of claim 14, wherein the detecting of the plurality of ridges divides the depth image of the mask into the active portion and the non-active portion, using an average depth value of the non-active portion as a threshold value.

16. The target analysis method of claim 15, wherein the verifying of the plurality of ridges comprises:
    determining a connection point between the active portion and the non-active portion;
    connecting the determined connection point and an end of one of the plurality of ridges to generate an imaginary ridge; and
    verifying the plurality of ridges and the imaginary ridge.

17. At least one non-transitory computer-readable medium comprising computer readable instructions that control at least one processor to implement a target analysis method based on a depth image and an intensity image of a target, the target analysis method comprising:
- detecting a body of the target from the intensity image of the target;
- calculating an intensity threshold value in accordance with intensity values from the detected body;
- transforming the intensity image into a binary image using the intensity threshold value;
- masking the depth image of the target using the binary image as a mask to thereby obtain a masked depth image; and
- detecting an active portion of the body of the target from the masked depth image,
- wherein the active portion of the body includes at least one part of the body having a relatively large motion,
- wherein a non-active portion of the body of the target includes a human head and torso and the active portion includes human arms and legs.

* * * * *